United States Patent [19]

Ogino et al.

[11] 4,455,334
[45] Jun. 19, 1984

[54] MOLDED GLAND PACKING

[75] Inventors: Kohzo Ogino; Tomikazu Shiomi; Yuichi Tanaka; Seichi Yamashita, all of Hyogo, Japan

[73] Assignee: Nippon Pillar Packing Co. Ltd., Japan

[21] Appl. No.: 380,938

[22] Filed: May 21, 1982

[51] Int. Cl.³ .............................................. B32B 9/00
[52] U.S. Cl. ....................................... 428/36; 428/37; 428/255; 428/256; 428/312.2; 428/408; 428/307.7; 264/279.1; 277/235 B
[58] Field of Search ............... 428/304, 408, 255, 256, 428/312.2, 36, 37

[56] References Cited

U.S. PATENT DOCUMENTS

| 3,203,849 | 8/1965 | Katz et al. | 428/408 |
| 3,726,738 | 4/1973 | Gellon et al. | 428/408 X |
| 4,092,453 | 5/1978 | Jonda | 428/255 |
| 4,234,638 | 11/1980 | Yamazoe et al. | 428/408 X |
| 4,302,495 | 11/1981 | Marra | 428/255 |
| 4,349,398 | 9/1982 | Kearns et al. | 428/255 X |

FOREIGN PATENT DOCUMENTS 1221003  7/1966  Fed. Rep. of Germany ........ 428/36

Primary Examiner—P. Ives
Attorney, Agent, or Firm—Steele, Gould & Fried

[57] ABSTRACT

A molded packing, comprising a volute laminate of a composite sheet material compressed into a unified annular form of rectangular cross-section. The composite sheet material is formed by unifying an expanded graphite sheet and a reinforcing core member, the laminated core facilitating insertion and removal of the packing and improving sealing performance. The composite sheet material may be formed by pressingly contacting one or two expanded graphite sheets to a core member. The core member may be formed from a metallic net, a metallic foil or a plurality of fine metallic threads.

6 Claims, 7 Drawing Figures

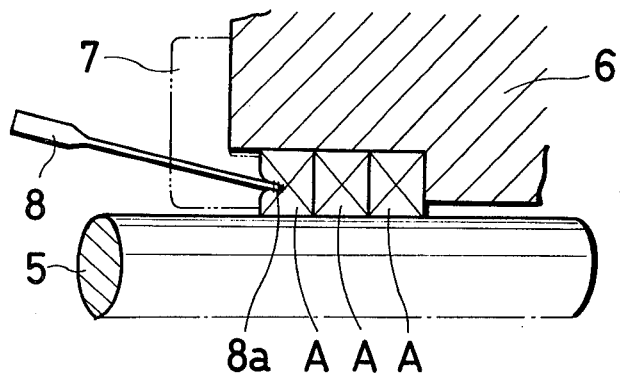
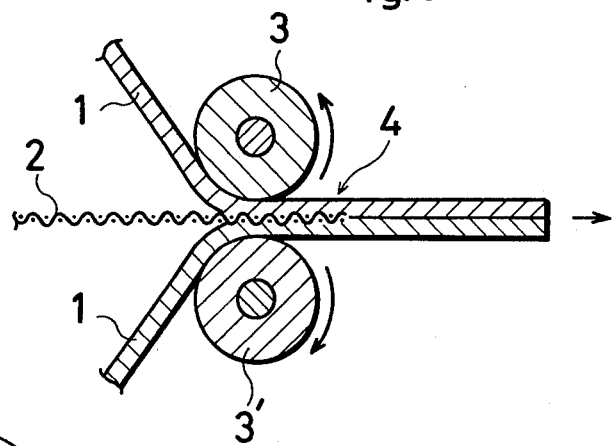
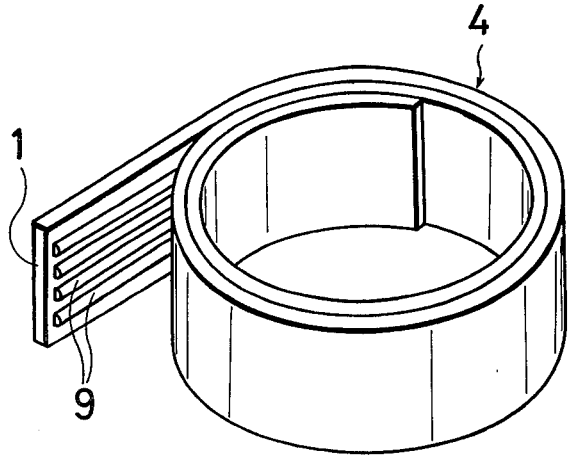
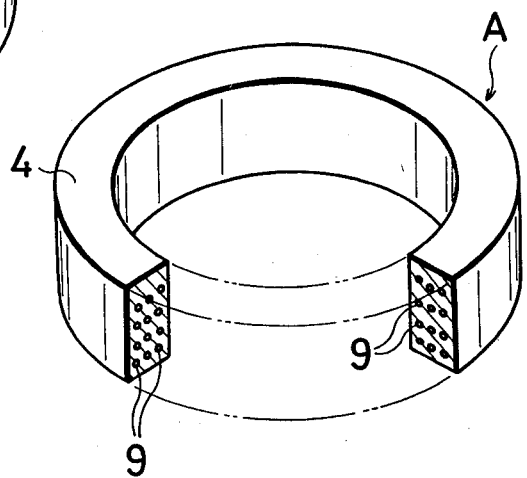

MOLDED GLAND PACKING

BACKGROUND OF THE INVENTION

The present invention relates to molded packing for intercepting all sorts of fluids which is incorporated in a fluid device used in a nuclear power industry or general industries, and more particularly to easily removable molded packings.

There is conventionally known packing made of only expanded graphite such as GRAPHOIL (manufactured by Union Carbide Co., in U.S.A.). In general industries, such packing is incorporated in the shaft sealing portion, i.e., in the chamber formed by a shaft and a casing of a fluid device such as a valve or pump, thereby to prevent a fluid from leaking to the outside of the device. Such packing made of only expanded graphite is resilient and the characteristics inherent in graphite can be utilized as they are. Thus, such graphite packing is regarded as relatively excellent.

However, such packing produces a high sliding resistance against a member such as a shaft where the packing is installed. Moreover, if the sealing conditions are severe, the packing sticks to the shaft, thus disadvantageously lowering the sealing function of the packing.

Moreover, expanded graphite is in nature fragile, thus requiring care in handling when graphite packing is mounted to the sealing portion of a fluid device. In particular, at the time of replacement of packing for repair or regular checking, the removal of such packing made of only expanded graphite from the shaft sealing portion of a fluid device is extremely difficult and troublesome. Namely, since such packing has been packed with a predetermined fastening pressure, the packing is often held strongly by and rigidly stuck to the shaft sealing portion. Therefore, the removal of such packing from a narrow chamber formed by the shaft and the device casing is extremely difficult. Even if a packing removing means such as a scratch rod is used, the packing is crumbled and the crumbled pieces are merely removed. Accordingly, in order to completely remove the packing from the shaft sealing portion, it is required to disassemble the fluid device. Furthermore, if the shaft sealing portion is frequently scratched with a packing removing means, the shaft or the device casing may be damaged.

In the nuclear power industry, it is of urgent necessity to solve the problem how to shorten the time required to mount and remove the packing, in view of the exposure of workers to radiation.

OBJECTS OF THE INVENTION

It is an object of the present invention to provide molded packing in which the excellent characteristics inherent in expanded graphite as packing material are utilized as they are, and mechanical strength and resiliency are improved as compared with conventional packing made of only expanded graphite, thereby to reduce a sliding resistance of the packing against a member such as a shaft where the packing is installed, thus enabling to satisfactorily intercept a fluid of high load without any inconvenience such as sticking of the packing to the shaft.

It is another object of the present invention to provide molded packing which is not unexpectedly crumbled when such packing is removed from the shaft sealing portion or the like of a device with the use of a scratch rod, so that such removal can be smoothly and quickly performed.

It is a further object of the present invention to provide molded packing which can be mounted to the shaft sealing portion or the like of a device in a satisfactory and easy manner without crumbling of the packing.

BRIEF DESCRIPTION OF THE DRAWINGS

The present invention will be further described, by way of example, with reference to the accompanying drawings, in which:

FIG. 4 is a section view illustrating the molded packing installed in the shaft sealing portion in a device;

FIG. 5 is a section view illustrating another manufacturing process of a composite sheet material;

FIG. 6 is a perspective view of still another composite sheet material rolled in the volute shape; and FIG. 7 is a perspective view, with portions broken away, of molded packing obtained by compressively forming the rolled composite sheet material in FIG. 6, into the ring shape.

DETAILED DESCRIPTION OF THE PREFERRED EMBODIMENTS

The description hereinafter will describe in detail molded packing in accordance with the present invention with reference to the drawings.

Figure 1:
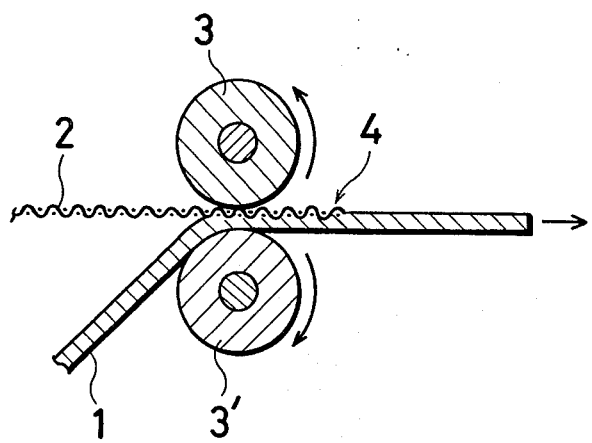
FIG. 1 is a section view illustrating a manufacturing process of a composite sheet material.

FIG. 1 illustrates how to manufacture a composite sheet material 4 which forms the basis of molded packing in accordance with the present invention.

As shown in FIG. 1, an expanded graphite sheet 1 and a netlike structure 2 are respectively supplied to a roll machine, where they are passed between two pressing rolls 3 and 3' such that the netlike structure 2 is sunk into one side of the expanded graphite 1. They are pressingly contacted with each other in a unitary structure, thus forming the composite sheet material 4. The expanded graphite sheet 1 has dimensions of, for example, a thickness of 0.25 mm and a width of 12.7 mm, and the netlike structure 2 is made of, for example, a metallic net formed by knitting a 0.1 dia. metal fine thread. This knitted metal net is cut so as to have a width of, for example, 8 mm narrower than the width of the expanded graphite sheet 1.

Figure 2:
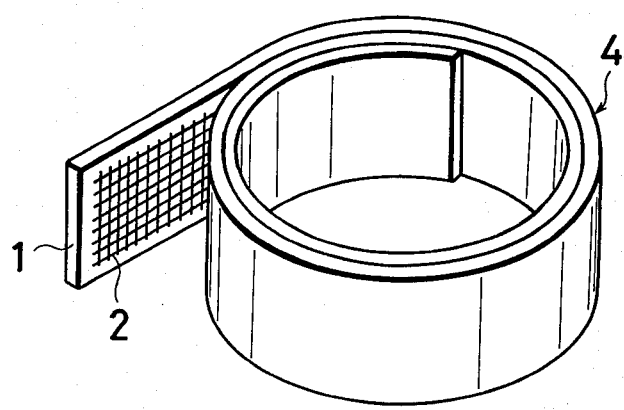
FIG. 2 is a perspective view of the composite sheet material obtained according to the manufacturing process in FIG. 1, which is rolled in the volute shape.
Figure 3:
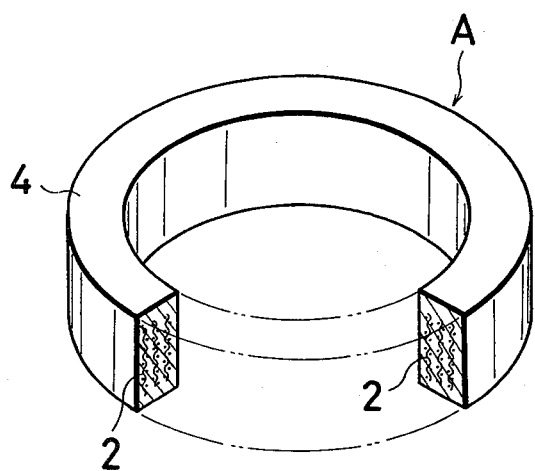
FIG. 3 is a perspective view, with portions broken away, of molded packing obtained by compressively forming the rolled composite sheet material in FIG. 2, into the ring shape.

As shown in FIG. 2, this composite sheet material 4 is cut in a desired length and suitably rolled in the volute shape. Thus rolled composite sheet material 4 is compressed in the thicknesswise and widthwise directions with a forming metal mold (not shown), so as to produce molded packing A in the ring shape as shown in FIG. 3.

Since the composite sheet material 4 is formed by pressingly contacting the netlike structure 2 and the expanded graphite sheet 1 with each other into a unitary structure with the use of the pressing rolls 3 and 3', the operation to make the molded packing A may be facilitated, thereby to enhance the manufacturing efficiency.

In thus manufactured molded packing A, the expanded graphite sheet 1 and the netlike structure 2 are not easily separated from each other but are securely unified. Thus, the molded packing A is not fragile. Accordingly, the molded packing A is excellent in performance and maneuverability. In view of the performance as packing, the provision of the netlike structure 2 enhances mechanical strength and additionally provides resiliency. Therefore, as compared with conventional packing made of only expanded graphite, the packing in accordance with the present invention has a smaller sliding resistance against the shaft or the like in a device where the packing is installed. Therefore, the packing in accordance with the present invention may be applied to a device where a high load fluid is to be intercepted, without any danger of sticking of the packing to the device.

It is generally required to accurately fasten packing such that the packing has a proper fastening surface pressure value dependent on the pressure of a fluid to be intercepted. In this connection, the molded packing A in accordance with the present invention may have a predetermined allowance with respect to such fastening surface pressure value. Moreover, since the packing A is not fragile, the assembling may be facilitated. The foregoing permits the packing A to be assembled and fastened in a rather rough manner at the installation site by field workers.

The molded packing A is generally used as shown in FIG. 4, which schematically illustrates in section the shaft sealing portion of a fluid device. A plurality of molded packings A are mounted in a shaft sealing chamber formed by a shaft 5 and a device casing 6. The formed packings A are fastened and held by a removable gland plate 7, shown in phantom. When it is desired to remove these molded packings A from the shaft sealing chamber for some reasons, the packings A may be removed with the use of suitable packing removing means such as a packing screw 8 after the gland plate 7 has been removed. Since the molded packing A incorporates the netlike structure 2 in a layered manner, the tip 8a of the packing screw 8 gets intertwined with the netlike structure 2 when the packing screw 8 is pushed into the packing A. Thus, the molded packing A itself may be smoothly removed from the shaft sealing chamber.

As the core member to be pressingly contacted with the expanded graphite sheet 1, various materials and structures may be suitably selected. There may be selected not only a metallic net formed by knitting a metal fine thread, such as a stainless steel, copper, aluminium or iron fine thread, but also a fabric formed by weaving inorganic fibers having a predetermined strength such as ceramic, glass or carbon fibers, or an organic fabric made of phenolic resin fibers or the like.

Besides the core member of a netlike structure as above-mentioned, there may be favorably used a foil-like member, i.e., a metallic foil such as a stainless steel foil, an aluminium foil, a nickel foil or a copper foil, formed by rolling metal thinly and flatly.

It is also preferred to use one metallic thread or a plurality of metallic threads arranged in parallel.

For example, the composite sheet material 4 may be formed by pressingly contacting a plurality of metallic thin threads 9 with one side of the expanded graphite sheet 1, the metallic thin threads 9 being spaced with suitable intervals. As shown in FIG. 6, such composite sheet material 4 may then be rolled in the volute shape. Thus, rolled composite sheet material 4 is compressingly formed, thereby to obtain a ring-shape molded packing A in which the metallic threads 9 are arranged evenly or uniformly over the entire section of the packing A as shown in FIG. 7. Removal of such molded packing A shown in FIG. 7, may be performed also smoothly with the use of a packing removing means such as a packing screw, the tip of which gets intertwined with the metallic threads incorporated in the packing A.

As the metallic thread there may be suitably used a stainless steel thread, a copper thread or an aluminium thread. Instead of a metallic thread, there may be used a metallic fiber, an asbestos fiber, a ceramic fiber, or a carbon fiber. It is preferred to use a metallic thread having a diameter of 0.1 to 0.5 mm.

As shown in FIG. 5, the expanded graphite sheets 1 may be pressingly contacted with the respective sides of the core member, for example, the netlike structure 2, with the pressing rolls 3. Thus, there may be further preferably formed a composite sheet material 4 in which the netlike structure 2 is covered and unified with the expanded graphite sheets 1. Molded packing made of such composite sheet material shown in FIG. 5, hardly crumbles, thereby to further facilitate the removal of the packing.

While in the embodiments above-mentioned the netlike structure 2 and the expanded graphite sheets 1 are unified by pressingly contacting them with each other, they may be unified with the use of suitable adhesives. It is important that the composite sheet material is formed by unifying the netlike structure 2 and the expanded graphite sheets 1 by pressing contact or with the use of adhesives. Namely, in order to obtain the molded packing A as shown in FIGS. 3 and 7, the unified composite sheet material is layered or rolled in the volute shape as shown in FIGS. 2 and 6, and is then compressingly formed. Accordingly, if the expanded graphite sheet is separated from the core member such as the netlike structure, the manufacturing operation requires much labor.

If packing is formed with the expanded graphite sheet separated from the core member, there may be a case where portions of such packing crumble with portions of the expanded graphite remaining in the shaft sealing chamber. The molded packing in accordance with the present invention eliminates such defect.

When the molded packing in accordance with the present invention is mounted to the stem or shaft in a device the material of which is soft and there is the danger of such soft stem or shaft being damaged by the core member such as the netlike structure in the packing, it is necessary to form the width of the core member as narrower than that of the expanded graphite sheet so that the core member is not exposed to the surface of the molded packing.

In the embodiments above-mentioned, the description has been made on packing in which the expanded graphite sheet is used as a sheet material overlapped on the core member, while there may be used other material such as a rubber sheet, a fluorine resin sheet, an asbestos sheet.

What is claimed is:

1. A molded gland packing, comprising a volute laminate of a composite sheet material compressed into a unified annular form of rectangular cross-section, the composite sheet material having a plurality of spirally-wound and bonded layers, each layer having an expanded graphite sheet and a reinforcing core member embedded in one side of the expanded graphite sheet, the reinforcing core being fully embedded within the cross-section of the laminate and facilitating insertion and removal of the molded packing and improving sealing performance.

2. The molded packing as set forth in claim 1, wherein the core member is a netlike structure.

3. The molded packing as set forth in claim 2, wherein the netlike structure is a metallic net.

4. The molded packing as set forth in claim 2, wherein the netlike structure comprises a fabric formed from woven inorganic fibers.

5. The molded packing as set forth in claim 1, wherein the core member comprises at least one fine metallic thread.

6. The molded packing as set forth in claim 1, wherein the core member comprises a metallic foil.

* * * * *